United States Patent
Libor et al.

(10) Patent No.: US 8,846,796 B2
(45) Date of Patent: Sep. 30, 2014

(54) METHOD OF PRODUCING A MODIFIED SMECTITE OR SMECTITE-CONTAINING SUBSTANCE CAPABLE OF TAKING UP AND RELEASING WATER IN A REVERSIBLE MANNER

(75) Inventors: Oszkar Libor, Budapest (HU); Jacobus Cornelis Wammes, Velddriel (NL)

(73) Assignee: Trisoplast International B.V., Veiddriel (NL)

( * ) Notice: Subject to any disclaimer, the term of this patent is extended or adjusted under 35 U.S.C. 154(b) by 0 days.

(21) Appl. No.: 12/597,179

(22) PCT Filed: Apr. 22, 2008

(86) PCT No.: PCT/NL2008/000110
§ 371 (c)(1),
(2), (4) Date: Oct. 23, 2009

(87) PCT Pub. No.: WO2008/133497
PCT Pub. Date: Nov. 6, 2008

(65) Prior Publication Data
US 2010/0087580 A1 Apr. 8, 2010

(30) Foreign Application Priority Data
Apr. 26, 2007 (EP) .................................. 07008509

(51) Int. Cl.
*C09K 17/40* (2006.01)
*C08K 3/34* (2006.01)
*E02D 31/04* (2006.01)
*C01B 33/44* (2006.01)

(52) U.S. Cl.
CPC ............... *C01B 33/44* (2013.01); *E02D 31/04* (2013.01); *C09K 17/40* (2013.01)
USPC ......................................... 524/446; 524/447

(58) Field of Classification Search
USPC ................................................ 524/446–447
See application file for complete search history.

(56) References Cited

U.S. PATENT DOCUMENTS

| | | | | | |
|---|---|---|---|---|---|
| 4,600,744 | A | * | 7/1986 | Libor et al. | 524/446 |
| 5,450,817 | A | * | 9/1995 | Hahn et al. | 119/173 |
| 5,476,142 | A | * | 12/1995 | Kajita | 166/294 |
| 6,096,847 | A | * | 8/2000 | LoSasso | 526/287 |
| 7,026,385 | B2 | * | 4/2006 | Wammes et al. | 524/446 |
| 2004/0028678 | A1 | * | 2/2004 | Schall et al. | 424/140.1 |

FOREIGN PATENT DOCUMENTS

| | | |
|---|---|---|
| DE | 41 24 338 A1 | 1/1993 |
| EP | 0 335 653 A1 | 10/1989 |
| EP | 0 645 181 A2 | 3/1995 |
| EP | 0 952 187 A1 | 10/1999 |
| EP | 1 055 706 A1 | 11/2000 |
| EP | 1 589 077 A1 | 10/2005 |
| HU | 36072 T * | 8/1985 |
| WO | 94/18284 A | 8/1994 |

OTHER PUBLICATIONS

Haug (Hydraulic Conductivity and Waste Contaminant Transport in Soil: Influence of Polymers on the Hydraulic Conductivity of Marginal Quality Bentonite-Sand Mixtures, 1994, pp. 407-409).*
IMA-NA (Bentonite, Industrial Mineral Association North America, 2009, 2 pages).*
Derwent Abstract of HU 36072 T (AN 1985-244848, 1985, 2 pages).*
English language translation of HU 189280 B, which is the same as HU 16072 (14 pages, Aug. 1985).*
International Search Report for PCT/nL2008/000110 dated Apr. 15, 2009, Issued from the European Patent Office.

* cited by examiner

*Primary Examiner* — Brieann R Fink
(74) *Attorney, Agent, or Firm* — Shumaker, Loop & Kendrick, LLP

(57) ABSTRACT

A method for producing a modified smectite or smectite-containing substance including treating a non-activated smectite or substance with a water soluble activating agent and polymer in a two stage process, the first stage including adding 0-3.0% of the activating agent and 0.05-1.0% of the polymer, by weight, and in a second stage adding 0-5.0% of the activating agent 0.3-5% of the polymer, by weight, to the mixture of the first stage, wherein at least a part of the polymer is added as a dry solid and the water in the first stage is at least 20% by weight and at most 50% by weight in the second stage.

15 Claims, No Drawings

METHOD OF PRODUCING A MODIFIED SMECTITE OR SMECTITE-CONTAINING SUBSTANCE CAPABLE OF TAKING UP AND RELEASING WATER IN A REVERSIBLE MANNER

TECHNICAL FIELD AND BACKGROUND OF THE INVENTION

The invention relates to an improved method of producing a modified smectite or smectite-containing substance capable of taking up and releasing water in a reversible manner.

It is well known that the swellability of smectites and smectite-containing substances (such as rocks, mine products and artificial mixtures) can be improved considerably by subjecting them to activation. In this respect activation means that the starting smectite or smectite-containing substance is treated with a salt of a monovalent cation and/or with a magnesium compound. Examples of smectites are montmorillonite, beydellite, hectorite, nontronite, illite, allevardite and palygorskite. A particularly important representative of smectite-containing substances is bentonite. GB 458,240, GB 447,710 and DE 940,936 disclose the use of salts of monovalent cations, such as sodium, potassium, lithium and ammonium salts, as activating agents, whereas according to DE 1,081,436, DE 1,204,995 and DE 1,205,473 a magnesium compound, such as magnesium oxide or magnesium carbonate, is used as activating agent optionally in combination with a salt of a monovalent cation. Activation results in the formation of a highly swellable product which, when admixed with water, forms a thixotropic gel.

European patent application EP 0 645 181 relates to a method of treating a smectite clay that has been recovered and dried to moisture content of about 12% or less, based on the dry weight of the clay, to improve its ability to absorb or adsorb contaminated liquids when in contact with the liquid containing a dissolved salt or an organic contaminant. Such a method comprises several steps, i.e.

impregnating or mixing the clay with dissolved polymer from a an aqueous solution in an amount of at least about 0.5% by weight, based on the dry weight of the clay, and rewetting the clay with water to a moisture content of more than about 12% by weight, based on the dry weight of the clay;

drying the rewetted polymer-impregnated clay to a moisture content of about 12% by weight or less, based on the dry weight of the clay; and contacting the treated clay with the contaminated liquid.

It is also well known that the activated forms of smectites and smectite-containing substances (e.g. activated bentonite) are able to react with water soluble polymers under forming gels which are no longer thixotropic, have a stable structure, and are capable of taking up and releasing water in a reversible manner (see e.g. EP-A 0,335,653, U.S. Pat. No. 5,120,344, U.S. Pat. No. 5,640,168, U.S. Pat. No. 6,340,385 and references cited therein). The resulting gels are excellent sealing agents and can be used primarily to provide for watertight insulations.

The known methods for producing such gels can be classified into four main groups:

(1) the non-activated smectite or smectite-containing substance is activated first in the presence of water and reacted then with the polymer in the presence of water to form a cross-linked reaction product wherein chemical bonds are formed between the polymer and the elementary lamellae of the smectite (see e.g. HU 186,325 and HU 189,280); or (2) the non-activated smectite or smectite-containing substance is treated first with the polymer in the presence of water and then the resulting pre-reacted substance is treated with the activating agent in the presence of water to form the final cross-linked structure (see e.g. EP-A 0,335,653); or (3) as a combination of the above two methods; the non-activated smectite or smectite-containing substance is reacted in a single step, in the presence of water, with both the activating agent and the polymer to form the final cross-linked structure (see e.g. one of the methods disclosed in U.S. Pat. No. 5,120,344); or (4) the non-activated smectite or smectite-containing substance, the polymer and the activating agent are admixed in the absence of water, and the resulting dry mixture is applied on the surface to be watertightly insulated; the final cross-linked structure forms spontaneously when the mixture contacts with water (see e.g. U.S. Pat. No. 5,604,168).

The first three methods lead to the formation of high quality gels applicable with good results for insulation purposes. They have, however, the common disadvantage that as the formation of the final cross-linked structure proceeds, a very intense kneading of extremely high mechanical energy demand is required. The resulting moist hydrogel is difficult to store and transport. Therefore the references disclosing methods (1) to (3) above suggest to perform either the whole process or at least its final step directly at the place of use. However, the specific preconditions (e.g. specific equipments, energy source, skilled manpower etc.) of such a direct production can not always be met. To obtain a xerogel which is easy to store, transport and manipulate at the place of use the moist hydrogel is to be dried first, which is lengthy and requires much energy. These disadvantages render the methods less attractive from economical points of view.

The above difficulties can be avoided by using method (4). This method involves, however, the disadvantage that the insulating ability and adhesive power of the gel which forms spontaneously at the place of use highly depends on the prevailing environmental conditions which cannot be influenced. From the aspects of reliable product quality a fully controlled operation series is much more appropriate than one including a spontaneous step.

SUMMARY OF THE INVENTION

The present invention aims at elaborating a method for producing a modified smectite or smectite-containing substance capable of forming gels which are no longer thixotropic, have a stable cross-linked structure and an adhesive characteristic and are capable of taking up and releasing water in a reversible manner which is much more easy to perform and requires much less energy than methods (1) to (3) above, and produces a modified smectite or smectite-containing substance with high quality and reliable moisture insulating and adhesive characteristics.

DETAILED DESCRIPTION OF THE INVENTION

It has been found that these aims can be fully attained when the modified smectite or smectite-containing substance is produced by a two-stage activation coupled with polymer addition in both stages, followed by extrusion and a final drying step.

The cross linked gel structure enables the material to make a very good adhesion to different surfaces of for example barrier layers as there are connections to penetrating and side constructions, covering and underlaying layers (such as soil, stone, membranes and textiles). It is also very advantageous if the material is mixed with a filler material (eg sand). The gel sticks to the filler and is able to enclose the grains and to stick them together. Because of the sticky character a large range of filler material can be used still reaching good isolation properties. Together with the reversible swelling capacity the material is very capable to withstand drying cycles. The sticky gel structure slows down the drying effect and limits the volume of the drying cracks. If water comes cracks are easily closed by the swelling and closed gel structure formed by the secondary reaction possibilities of the polymer and smectite.

In the first stage of the method of the invention 0-3.0% by weight, calculated on the weight of the smectite, of a water soluble activating agent and 0.05-1.0% by weight, calculated on the weight of the smectite, of a water-soluble polymer capable of reacting with the smectite are admixed partly or in whole as aqueous solutions with a non-activated smectite or smectite-containing substance under adjusting the water content of the resulting mixture to a value not exceeding 50% by weight, and, if required, the resulting mixture is dried to a water content of 20% by weight or more.

At least part of the polymer and activation agent need to be added as an aqueous solution or become in dissolved state when admixed in the first stage. If there is enough high water content in the raw clay material one can compensate partly or in whole the addition of the dissolved polymer and/or activation agent by using in the first step longer stirring time to produce on the spot enough dissolved polymer and/or activation agent.

The activating agent and the polymer can be added to the smectite or smectite-containing substance either simultaneously or in one or more consecutive steps. It is preferred to add the aqueous solution of the activating agent first.

If the lattice sodium and lithium ions of the smectite, if any make up not more than 50% of the sum of exchangeable lattice cations, than the lower limit of a water soluble activating agent in the first stage of the present method is set on 0.1% by weight.

As both the activating agent and the polymer are introduced in the first stage mainly as aqueous solutions, quick reactions occur. However, the reaction conditions prevailing in this first stage—in particular the ratios of the individual reactants—do not enable a full reaction leading to the required final cross-linked stable structure. At this stage only a partial activation proceeds coupled with the formation of some chemical bonds between the smectite and the polymer. This involves that stirring does not require high mechanical energy. Taking into account that the second stage requires the presence of at least 20% by weight of water, drying of the resulting mixture is not always necessary. If a drying step is still included, this involves usually removal of only a part of water introduced with the two aqueous solutions; thus the energy requirement of this optional drying step is low.

In the second stage 0-5% by weight, calculated on the weight of the smectite, of a water soluble activating agent and 0.3-5% by weight, calculated on the weight of the smectite, of a water soluble polymer capable of reacting with the smectite are added under stirring to the mixture obtained in the first stage, which contains at least 20% by weight of water, wherein the water soluble polymer is added partly or in whole as a dry solid. Although activation continues under these conditions, the dissolution of the polymer is rather slow, thus the amount of dissolved polymer is insufficient to form the final cross-linked structure. This involves that stirring does not require high mechanical energy in this stage, either.

If the lattice sodium and lithium ions of the smectite, if any make up not more than 50% of the sum of exchangeable lattice cations, than the lower limit of a water soluble activating agent in the second stage of the present method is set on 0.5% by weight.

The activating agent and the polymer can be added to the smectite or smectite-containing substance in the second phase either simultaneously or in one or more consecutive steps.

It is preferred that in the first stage at least a part of both the water soluble activating agent and the water soluble polymer are admixed as aqueous solutions, especially that in the second stage at least a part of the water soluble polymer is admixed as dry solids.

The two stage process is preferred but in another embodiment of the present invention the process for producing a modified smectite or smectite-containing substance can also be carried out as a one stage process.

In this embodiment the conditions that influence the reactions (such as quality of the components in the mixture, water content, dissolution stage of the polymer and the activation agent, mixing intensity and duration) must be very well controlled and adjusted to each other to prevent on the one hand the formation of the final cross-linked structure in a too early stage and on the other hand a too low intensity of the reactions. Consequently the cross linked structure reached in the final material of the process will in most cases be of a lower quality than when using the present two stage process. The embodiment of the one stage method will be more difficult to control and more sensitive to inaccuracies in practice (water content, dissolved stage and dosage time of admixed components, mixing time etc.).

The one stage method according to the present invention is characterized in that 0-6% by weight, calculated on the weight of the smectite, of the water soluble activating agent and 0.3-6% by weight, calculated on the weight of the smectite, of the water soluble polymer are admixed with the smectite or smectite-containing substance, wherein:

at least a part of the water soluble activating agent is added before or at latest simultaneously with the soluble polymer, wherein at least a part of the water soluble polymer is a dry solid, the mixture obtained contains an amount of water in a range of from 20% by weight of water to 50% by weight of water, on basis of the mixture.

The smectite or smectite-containing substance as starting material has preferably a water content of at least 13% by weight. In case the water content is below said range, additional water is needed.

If the lattice sodium and lithium ions of the smectite, if any make up not more than 50% of the sum of exchangeable lattice cations, than the lower limit of a water soluble activating agent in the one stage method of the present invention is set on 0.1% by weight.

The homogenized mixture obtained at the end of the present process is subjected to extrusion to form shaped bodies (e.g. pellets, rods, granules, small blocks etc.). Upon the pressure and shearing forces exerted on the mixture by the extruder and upon local warming of the mixture in the extruder activation of the smectite continues and subsequent reactions between the smectite and the polymer proceed, leading to the formation of the required final cross-linked structure. This means that this extrusion step replaces the long, cumbersome and energy-intensive mechanical kneading required in the known methods to obtain a cross-linked smectite/polymer reaction product capable of taking up and releasing water in a reversible manner.

In this extrusion step shaped bodies are formed, which are subsequently dried and/or comminuted. As the specific surface area of these shaped bodies is much greater than that of the mixture before extrusion, drying can be performed easily and quickly and with acceptably low energy requirement. Sometimes it is sufficient to keep the shaped bodies at ambient temperature, optionally in a ventilated chamber. A part of the water content is removed from the starting mixture during extrusion, which further reduces the energy requirements of the drying step.

Similar effects can be reached if instead or beside of extrusion, longer and intensive stirring in combination with pressing and/or heating is applied. During compaction, stirring and milling by conventional methods in open fields also a part of the water content is removed from the mixture and crumbly pieces are formed, after which the material can easily be dried and/or comminuted.

Drying should be performed at temperatures which do not damage either the polymer or the polymer/smectite bond. Therefore it is advisable that the temperature of the surface of the substance to be dried does not exceed 120° C. This also relates to the optional drying step after the first stage.

The dried shaped bodies, when they are small enough, can be used for water insulation purposes as such, but it is more preferred to comminute them before use. This can be done by conventional operations, e.g. grinding, crushing, powdering, etc.

The modified smectites and smectite-containing substances are produced according to the invention under fully controlled conditions. This involves that they can be prepared with prescribed and reliable quality characteristics, and all undesired fluctuations in quality which can be attributed to spontaneous gel formation can be avoided.

The modified smectite or smectite-containing substance produced according to the invention may (and usually does) contain some unreacted activating agent and/or polymer, and the smectite itself may (and usually does) contain sites capable of ion exchange with activating agents. These remainders of reactants and activable sites serve as depots for further reactions when the modified smectite or smectite-containing substance contacts with water during its use. These further reactions strengthen further the cross-linked gel structure, which means that the insulating properties of the modified smectite or smectite-containing substance improve in parallel with its use.

All smectites and smectite-containing substances (natural rocks, mine products, artificial mixtures etc.) mentioned in the literature as ones suitable for insulation purposes can be used as starting substances in the method according to the invention. Of the smectite-containing substances those with a smectite content of at least 30% by weight are preferred. Mixtures of two or more smectites and/or smectite-containing substances are also applicable. Even smectites and smectite-containing substances with high monovalent cation contents (such as sodium-rich bentonite originating from Wyoming etc.) are not excluded. When the starting smectite or smectite-containing substance belongs to this type, the amount of activating agent to be added can be left out in the first and/or the second stage but is best kept close to the lower limit and preferably a magnesium compound can be used as activating agent either alone or in combination with a salt of a monovalent cation.

In a specific embodiment of the present invention it is preferred to add a small amount (usually about 0.1-2% by weight, calculated on the weight of the smectite) of a water soluble alkaline earth metal compound to the mixture when the starting smectite or smectite-containing substance is rich in monovalent cations. These added alkali metal compounds assist in the formation of bridge bonds between the smectite and the polymer. When the monovalent cation content of the starting smectite or smectite-containing substance is low, it is usually not required to use magnesium compounds as activating agents and/or to add a water soluble alkaline earth metal salt to the mixture.

As a particular advantage, crude smectite-containing rocks or mine products can also be used in the method of the invention. The term "crude" means here that the smectite-containing rock or mine product is used in the form as obtained from the mine, without any pre-treatment.

All activating agents listed in the cited references can be used in the process according to the invention either alone or as a combination of two or more activating agents. Although of the monovalent cation salts those having an anion which forms insoluble precipitate with alkaline earth metals are preferred, the scope of activating agents is not restricted to these salts (see in this respect DE 940,396). Alkali metal carbonates and phosphates, such as sodium carbonate, trisodium phosphate and lithium carbonate, are particularly preferred activating agents.

Water-soluble polymers capable of reacting with smectites can be used in the process according to the invention. Mixtures of two or more polymers can also be used. The molecular weight of the polymer is generally above 900,000 and below 15,000,000; the preferred molecular weight range being 2,000,000-12,000,000. Preferred polymers are the following ones: polyacrylamide, polymethacrylamide, polyacrilic acid, polymethacrylic acid, partially hydrolysed polyacrylamide, copolymers of acrylamide and acrylic acid, copolymers of acrylamide and an acrylic ester, partially hydrolysed variants of these latter copolymers, copolymers of vinyl alcohol and acrylic acid, polyvinylalcohols, partially or fully hydrolysed polyvinyl esters, polyethylene oxides, polysaccharides and graft copolymers wherein acrylic acid, methacrylic acid, acryl amide and/or methacryl amide side chains are grafted onto a cellulose backbone. In a special embodiment it is preferred that said water soluble polymer is a linear chain acrylamide type (co)polymer with a hydrolysis degree of at most 30%.

Any of the conventional extruders can be used to perform extrusion. As it has been indicated before, local warming of the mixture occurs during extrusion which highly assists the formation of the final cross-linked structure. It is preferred to keep the temperature of the locally warmed mixture below 150° C.

The present invention relates to a smectite or smectite-containing substance capable of forming a gel and taking up and releasing water in a reversible manner containing 0-6% by weight, calculated on the weight of the smectite, of a water soluble activating agent and 0.3-6% by weight, calculated on the weight of the smectite, of a water soluble polymer, wherein at least 10% by weight (calculated on the total polymer binding capacity of the smectite) of the polymers is bound with the clay producing a clay organic compound and at least 15% by weight (calculated on the total polymer binding capacity of the smectite) of the polymers is in free form i.e not bound with the clay, wherein said substance preferably contains 0.1-2% by weight, calculated on the weight of the smectite, of a water soluble alkaline earth metal compound.

The modified smectites or smectite-containing substances produced according to the invention can be applied onto the area or object to be treated by any technique used in insulation. Examples of such techniques are discussed in detail in the cited references.

The present invention furthermore relates to the use of modified smectites or smectite-containing substances in combination with an inert material as a watertight insulation, wherein the inert material has been chosen from the group of sand, crushed rock filler and water insoluble industrial solid waste. In addition, the modified smectite or smectite-containing substance content (calculated on the dry weight of the filler) is at least 4%, preferably at least 10%, and wherein more than 75% (preferably more than 85%) of the filler has a particle size >63 µm.

The modified smectites or smectite-containing substances produced according to the invention can be used for producing watertight insulations but is also applicable in all purposes that can use different silicate/organic hydrogels. Particularly preferred fields of use are as follows:

watertight insulation of (water) basins, reservoir, dams, waste areas and other objects exposed to damaging effects of water;

insulation of waste stores;

cover layer of underground waste stores prior to recultivating their surface;

filling agent for cavities and cracks on walls, damps and other objects exposed to water;

to form a barrier layer for improving water and nutrient retention of soils;

to form a vibration-balancing and insulating bed for railways, roads and other objects exposed to vibration damages.

The modified smectites or smectite-containing substances produced according to the invention can be used for the above purposes either as such or in admixture with one or more conventional additives. Typical examples of conventional additives are disclosed in U.S. Pat. No. 5,640,168 and U.S. Pat. No. 6,340,385.

These uses are also covered by the scope of the invention.

The invention now will be illustrated on basis of the following non-limiting examples.

Example 1

Crude bentonite originating from Mylos (Greece) with a smectite content of 80% by weight was used as starting smectite-containing substance. 5.0 g of sodium carbonated dissolved in 150 ml of water were added under stirring to 1.0 kg of the starting substance to obtain a mixture containing 35% by weight of water. The mixture was stirred for further 15 minutes, thereafter 120 ml of a 0.5% by weight aqueous solution of an acrylic acid/acrylamide copolymer (molecular weight: 4,000,000: degree of hydrolysis: 15%) were added to the mixture under stirring. The mixture was stirred for further 10 minutes and dried then to a water content of 32% by weight at a temperature not exceeding 80° C. Thereafter 20.0 g of powdered sodium carbonate and 12.0 g of the above copolymer in the form of beads of fine particle size were added to the pre-dried mixture under intense stirring. The mixture was homogenized and then passed through a household meat mincer serving as an extruder. The resulting thin rods were dried at 80° C. and powdered then in a laboratory hammer mill.

The resulting modified smectite-containing substance was subjected to the following tests:

(A) Reversibility of Water Uptake and Release;

20.0 g of the modified smectite-containing substance were admixed with 160 ml of water under stirring. A rapidly swelling hydrogel was formed. The hydrogel was dried at 80° C., and the resulting dry substance was powdered in a laboratory mortar. The resulting powder was admixed again with 160 ml of water under stirring, whereupon a stable hydrogel was obtained. This drying/wetting cycle was repeated five times whereupon the stable hydrogel could always be regenerated. This indicates that the modified smectite-containing substance is capable of forming a stable gel structure and of taking up and releasing water a reversible manner.

(B) Water Insulation Ability:

Dry coarse sand with a particle size of 1-3 mm was filled into a glass tube 10 cm in diameter open at both ends but thinned at the bottom part. A 4 cm thick layer of the modified smectite-containing substance was filled onto the sand. Water was filled onto the modified smectite-containing substance in a height of 1 m, and the assembly was allowed to stand. The sand filled into the bottom part of the tube remained fully dry even after 2 months, which indicates the excellent water insulating ability of the modified smectite-containing substance.

(C) Stable Gel Formation

The 4 cm thick modified smectite-containing layer was removed from the glass tube after 2 months. A wet saturated part was separated from the rest of the layer and could be formed by hand to a thin pancake shape and further locally it could be stretched to a thin membrane gel through which light from the other side could be observed but still showing a continuous cross-linked structure.

(D) Adhesive Properties 200 g of the modified smectite-containing substance were admixed with 50 ml of water and 1000 g of riversand with a grain size of 0-3 mm and 95%>63 µm. Dry coarse sand with a particle size of 1-3 mm was filled into a glass tube 10 cm in diameter open at both ends but thinned at the bottom part. A 7 cm thick layer of the mixture of modified smectite-containing substance and sand was filled onto the sand layer. A 30 cm thick top layer of the same dry coarse sand was filled onto the mixture layer. Water was filled onto the top layer in a height of 0.7 m, and the assembly was allowed to stand for four months. The modified smectite-containing layer was removed from the glass tube and a wet saturated part was separated from the rest of the layer. A flat pancake shaped material with a thickness of 1 cm could be formed and held at one side without rupture and sand particles were enclosed without falling out.

Example 2

Crude bentonite obtained from a Turkish mine, containing 70% by weight of smectite, was used as starting smectite-containing substance. 7.0 kg of sodium carbonate dissolved in 100 liters of water were added within 25 minutes to 1000 kg of the starting substance under constant stirring to obtain a mixture containing 33% by weight of water. Stirring was continued and 50 liters of an aqueous solution containing 8.0 kg of a partially hydrolysed polyacrylamide (molecular weight: 3,000,000) were added to the mixture. The resulting mixture was dried to a water content of 32% by weight at a temperature not exceeding 85° C. Thereafter 13.5 kg of powdered sodium carbonate and 10.5 kg of an acrylic acid/acrylamide copolymer (degree of hydrolysis: 25%, molecular weight: 3,500,000) in the form of fine granules were added to the pre-dried mixture under intense stirring. The mixture was extruded with a brick press, the resulting slabs were dried at 70° C., and the dried slabs were powdered in a ball mill.

The resulting modified smectite-containing substance was subjected to Tests (A) and (B) as described in Example 1, with the difference that in Test (A) 50 g of the modified smectite-containing substance were admixed with 200 ml of water. The results indicate that the modified smectite-containing substance is capable of forming a stable gel structure and of taking up and releasing water in a reversible manner, and has excellent water insulating ability.

Example 3

Crude sodium bentonite originating from Wyoming (U.S.) With a smectite content of 85% by weight was used as starting smectite-containing substance. 1.0 g of sodium carbonate dissolved in 80 ml of water was added under stirring to 500 g of the starting substance to obtain a mixture containing 36% by weight of water. This mixture was stirred for 25 minutes, during which period 60 ml of a 0.4% by weight aqueous solution of an acrylic acid/acrylamide copolymer (degree of hydrolysis: 20%, molecular weight: 2,500,000) were introduced. The homogenized mixture was dried to a water content of 32% by weight at a temperature not exceeding 80° C. Thereafter 5.0 g of powdered sodium carbonate, 1.5 g of powdered calcium hydroxide and 8.0 g of the above polymer in the form of fine granules were added to the dried mixture under intense stirring. The homogenized mixture was extruded on a laboratory extruder to a rod of 10 mm diameter, the rod was cut into small cylinders, the cylinders were dried at a temperature not exceeding 80° C., and the dried substance was powdered.

The resulting modified smectite-containing substance was subjected to Tests (A) and (B) as described in Example 1. The results indicate that the modified smectite-containing substance is capable of taking up and releasing water in a reversible manner, and has excellent water insulating ability.

Example 4

4.1. An amount of 20 gram of the end product produced according to example 1 was admixed with 200 ml of tapwater (hardness 12 G-degree). After one minute stirring (rpm 200/min) the suspension was filled into a 2 cm diameter glastube. After 30 minutes settling time the sludge volume and the remaining water turbidity was measured. The sludge volume was 5.5 cm. Above the precipitate a clean water phase was present (turbidity under 20 ntu)

4.2. A product was prepared using the same crude bentonite, activating agent and copolymer that was used and described in example 1. Components were admixed together in a dry condition in the same quantity and ratio as in example 1. The mixture was pulverised in a laboratory hammer mill. With 20 grams of this material the same test has been executed as was done in example 4.1. The resulting sludge volume was 3.2 cm and above the sludge a turbid suspension was present.

The invention claimed is:

1. A method for producing a modified smectite or smectite-containing substance capable of forming a gel with a stable cross-linked structure and capable of taking up and releasing water in a reversible manner, comprising:

treating a crude non-activated smectite or smectite-containing substance having a water content of at least 13% by weight with a water soluble activating agent and with a water soluble polymer capable of reacting with said smectite or smectite-containing substance, wherein in a first stage 0.17% to 3.0% by weight, calculated on the weight of the smectite or smectite-containing substance, of the water soluble activating agent and 0.05-1.0% by weight, calculated on the weight of the smectite or smectite-containing substance, of the water soluble polymer are admixed with the non-activated smectite or smectite-containing substance, wherein at least part of the polymer and the activating agent are added as an aqueous solution or become in a dissolved state during mixing because of the high water content in the crude smectite or smectite-containing substance, thereafter in a second stage 0-5.0% by weight, calculated on the weight of the smectite or smectite-containing substance, of the water soluble activating agent and 0.3-5% by weight, calculated on the weight of the smectite or smectite-containing substance, of the water soluble polymer are admixed with the mixture obtained in the first stage, wherein at least a part of said water soluble polymer is added as a dry solid, wherein the water content in the first stage is greater than 20% by weight and the water content in the second stage ranges from greater than 20% by weight to at most 50% by weight, on the basis of the mixture, which amount of water is insufficient for forming the final cross-linked structure, and in the mixture obtained at least 10% by weight, calculated on the total polymer binding capacity of the smectite or smectite-containing substance, of the polymer is bound with the smectite or smectite-containing substance producing a smectite or smectite-containing organic compound and at least 15% by weight, calculated on the total polymer binding capacity of the smectite or smectite-containing substance, of the polymers is in free form not bound with the smectite or smectite-containing substance.

2. A method as claimed in claim 1, wherein in the first stage at least a part of both the water soluble activating agent and the water soluble polymer are admixed as aqueous solutions.

3. A method as claimed in claim 1, wherein in the second stage at least a part of the water soluble polymer is admixed as dry solids.

4. A method according to claim 1, wherein a bentonite rich in alkali ions is used as non-activated smectite-containing substance, wherein 0.1-2% by weight, calculated on the weight of the smectite, of a water soluble alkaline earth metal compound is also added to the mixture.

5. A method according to claim 1, wherein the mixture obtained is formed into shaped bodies via extrusion and, if required, the resulting shaped bodies are dried and/or comminuted.

6. A method according to claim 1, wherein the mixture obtained is formed into crumbly pieces by stirring and milling the mixture in open fields in combination with pressing and/or drying and heating and, if required, the resulting shaped bodies are dried and/or comminuted.

7. A method according to claim 1, wherein a crude bentonite with a smectite content of at least 30% by weight is used as non-activated smectite-containing substance.

8. A method according to claim 1, wherein a water soluble polymer with a molecular weight exceeding 900,000 is used.

9. A method according to claim 1, wherein a water soluble polymer with a molecular weight of 2,000,000 to 12,000,000 is used.

10. A method according to claim 1, wherein said water soluble polymer is a linear chain acrylamide type (co)polymer with a hydrolysis degree of at most 30%.

11. A method according to claim 10, wherein a mixture of (co)polymers is used, wherein the amount of said linear chain acrylamide type (co)polymer is at least 30% by weight, calculated for the total weight of the mixture of (co)polymers.

12. A method according to claim 1, wherein an alkali metal carbonate and/or an alkali metal phosphate is used as the activating agent.

13. A method according to claim 5, wherein in the extrusion step the local temperature of the extruded mixture is maintained below 150 degrees Celsius.

14. A method according to claim 1, wherein in the first stage the activating agent and the polymer are added in consecutive steps, with the activating agent being an aqueous solution and added first.

15. A method according to claim 1, wherein in the second stage the activating agent and the polymer are added in consecutive steps, with the activating agent being an aqueous solution and added first.

\* \* \* \* \*

UNITED STATES PATENT AND TRADEMARK OFFICE
CERTIFICATE OF CORRECTION

PATENT NO. : 8,846,796 B2
APPLICATION NO. : 12/597179
DATED : September 30, 2014
INVENTOR(S) : Oszkar Libor et al.

Page 1 of 1

It is certified that error appears in the above-identified patent and that said Letters Patent is hereby corrected as shown below:

On the title page, item (73) Assignee city should read: Velddriel

Signed and Sealed this
Twenty-seventh Day of January, 2015

Michelle K. Lee
*Deputy Director of the United States Patent and Trademark Office*